US012535691B2

(12) United States Patent
Shi et al.

(10) Patent No.: US 12,535,691 B2
(45) Date of Patent: Jan. 27, 2026

(54) SPECTRAL POLARIZATION INTEGRATED IMAGING SYSTEM BASED ON SPATIAL DIMENSION CODING AND DESIGN METHOD THEREOF

(71) Applicant: CHANGCHUN UNIVERSITY OF SCIENCE AND TECHNOLOGY, Jilin (CN)

(72) Inventors: Haodong Shi, Jilin (CN); Jiayu Wang, Jilin (CN); Yingchao Li, Jilin (CN); Shuai Yang, Jilin (CN); Hongyu Sun, Jilin (CN); Zhuang Liu, Jilin (CN); Jianan Liu, Jilin (CN); Huilin Jiang, Jilin (CN)

(73) Assignee: Changchun University of Science and Technology, Jilin (CN)

( * ) Notice: Subject to any disclaimer, the term of this patent is extended or adjusted under 35 U.S.C. 154(b) by 229 days.

(21) Appl. No.: 18/221,669

(22) Filed: Jul. 13, 2023

(65) Prior Publication Data
US 2024/0019714 A1 Jan. 18, 2024

(30) Foreign Application Priority Data
Jul. 14, 2022 (CN) .......................... 202210856246.3

(51) Int. Cl.
*G02B 30/10* (2020.01)
*G01J 3/28* (2006.01)
*G01J 3/447* (2006.01)
*G02B 17/06* (2006.01)

(52) U.S. Cl.
CPC ............ *G02B 30/10* (2020.01); *G01J 3/2823* (2013.01); *G01J 3/447* (2013.01); *G02B 17/0636* (2013.01)

(58) Field of Classification Search
CPC ... G02B 30/10; G02B 17/0636; G01J 3/2823; G01J 3/447
See application file for complete search history.

(56) References Cited

PUBLICATIONS

Xiong et al "Design and optimization method of a convex blazing grating in the Offner imaging spectrometer", Applied Optics, 2021.*

(Continued)

*Primary Examiner* — Michelle M Iacoletti
*Assistant Examiner* — Jarreas Underwood
(74) *Attorney, Agent, or Firm* — Millen, White, Zelano & Branigan P.C.; William F. Nixon

(57) ABSTRACT

A snapshot spatial dimension spectral polarization integrated imaging system and a design method thereof are provided. An objective lens generate an image of a target on a DMD; the DMD is disposed on a focal plane of the objective lens and connected to the computer; the computer controls an encoding matrix loaded on the DMD to encode information; the light is reflected to the primary mirror after being encoded, and then is reflected by the primary mirror to the convex grating for dispersion; the light is then reflected to the third mirror; an encoded image is produced on the micro polarizer array detector; polarization channel coding is completed; the micro polarizer array detector is connected to the computer; and the computer resolves compressive spectral polarization image based on spectral polarization coding data cube obtained on a target surface of the micro polarizer array detector.

1 Claim, 3 Drawing Sheets

(56) References Cited

PUBLICATIONS

Xiong et al "Design and optimization method of a convex blazed grating in the Offner imaging spectrometer", Applied Optics, 2021.*
Bioucas-Dias, J. M. et al. "A New TwIST: Two-Step Iterative Shrinkage/Thresholding Algorithms for Image Restoration," IEEE Transactions on Image Processing, Dec. 2007, vol. 16, No. 12, pp. 2992-3004.

* cited by examiner

SPECTRAL POLARIZATION INTEGRATED IMAGING SYSTEM BASED ON SPATIAL DIMENSION CODING AND DESIGN METHOD THEREOF

CROSS REFERENCE TO RELATED APPLICATION

This patent application claims the benefit and priority of Chinese Patent Application No. 202210856246.3 filed with the China National Intellectual Property Administration on Jul. 14, 2022, the disclosure of which is incorporated by reference herein in its entirety as part of the present application.

TECHNICAL FIELD

The present disclosure relates to the field of an optical imaging technology, and in particular, to a snapshot spatial dimension spectral polarization integrated imaging system and a design method thereof.

BACKGROUND

Spectral features are inherent characteristics of different substances. Both spatial intensity and spectral information of a target can be obtained in spectral imaging, which has an advantage of a combination of spectrum and image and can effectively distinguish the target and a difference between the target and a background in terms of material as it is extremely sensitive to a type, material, and composition of the target. In traditional photoelectric detection, luminous intensity information contained in solar luminosity is reflected based on the optical characteristics of the material of the target, and as it is affected by factors such as complex environments and camouflage, a contrast of detection of the target is low, and thus the traditional photoelectric detection cannot be fully utilized in some environments. Polarization characteristic of light supplements intensity and frequency characteristics of light. Both distribution of the luminous intensity of the target and polarization information corresponding to the target can be obtained based on transverse wave characteristic of polarized light, and thus the target can be easily highlighted in complex backgrounds. Therefore, integration of spectroscopy technology, polarization technology, and imaging technology has great potential to obtain multi-dimensional characteristics of the target, and improve efficiency and accuracy of detection, recognition, and classification of the target, which has important application value and prospects in many fields such as military reconnaissance, Earth resource survey, environmental health monitoring, meteorological exploration, and biomedical diagnosis.

In recent years, a computational spectroscopy technology based on a spatial light modulator has been a research hot spot around the world as a snapshot spectral imaging technology with great advantages, in which a spectral cube can be captured in the form of a snapshot, and moving components are not needed, and thus a dynamic target can be better detected. The spectral and polarization multi-dimensional characteristics of the target can be obtained through one or more exposures by combining the polarization technology with the snapshot spectroscopy technology, thereby improving the efficiency and accuracy of detection, recognition, and classification of the target.

In the Chinese patent publication No. CN113188660A, entitled "a new snapshot polarization spectral imaging system with adjustable multi-dimensional parameters", a spectral dimension coding-based polarization spectrometer based on a DMD is proposed, which can flexibly modulate spatial resolution, spectral resolution, and a polarization state of the target, thereby implementing snapshot imaging based on multi-dimensional parameters. Coding spectral polarization imaging is mainly divided into two categories: spatial dimension coding and spectral dimension coding. To ensure high accuracy of spatiotemporal matching between a space, spectrum, and polarization coding information, an optical system needs to implement integrated imaging of single optical path and single detector spectral polarization. However, an existing design of the coding spectral polarization integrated imaging system, only adopts a design method of a spectrometer, and an imaging effect thereof depends on a correction afterward, without integrating optical design with computational optics, thereby resulting in distortion of the imaging.

SUMMARY

To resolve the problem that deviation and distortion of imaging are caused by an imaging effect depending on a post-algorithm correction in a traditional design method of a spectrometer in an existing design of a coding-based spectral polarization integrated imaging system, a spectral polarization integrated imaging system based on spatial dimension coding and a design method thereof are provided in the present disclosure. The method adopts an interactive design in a spectral polarization optical system with core components such as a coded aperture, a beam-splitting element, a micro polarizer array detector, and in a reverse design method of unmixing method-reconstruction algorithm-index optimization-optical design, adopts an algorithm model in computational optics as prior knowledge in an optical design to implement real-time imaging of a target based on polarization, spectrum and space, so as to meet requirements for an information matching degree and detection accuracy of the imaging system.

The technical solutions provided by the present disclosure for solving the technical problem are as follows.

A spectral polarization integrated imaging system based on spatial dimension coding includes an objective lens, a filter, a digital mirror device (DMD), a primary mirror, a convex grating, the third mirror, a micro polarizer array detector, and a computer; where an Offner system includes the primary mirror, the convex grating, and the third mirror; preferredly, the Offner system is consisted of the primary mirror, the convex grating, and the third mirror constitute;

the objective lens generates an image of a target on the DMD; the filter filters out light in a non-working band before the light enters into the DMD; the DMD is disposed on a focal plane of the objective lens; the DMD is connected to the computer; the computer controls an encoding matrix loaded on the DMD to encode information; the light is reflected to the primary mirror after being encoded by the DMD, and then the light is reflected by the primary mirror to the convex grating for dispersion; the light subjected to the dispersion is then reflected to the third mirror; an encoded image is produced on the micro polarizer array detector; polarization channel coding is completed by using a micro polarizer array on the micro polarizer array detector; the micro polarizer array detector is connected to the computer; and the computer performs calculation on spectral polarization coding data cube obtained on a target surface of the micro polarizer array detector to obtain a compressive spectral polarization image.

A design method of a spectral polarization integrated imaging system based on spatial dimension coding includes steps 1-8.

step 1: determining indicators and components of the spectral polarization integrated imaging system based on spatial dimension coding, which includes: analyzing a working scene of the system; determining spatial resolution, spectral resolution, the number of spectral channels, and the number of polarization channels of spectral polarization integrated system based on spatial dimension coding, based on an initial imaging structure of the system; and preliminarily determining a DMD, a grating, and a micro polarizer array detector as the components of the system;

step 2: determining the micro polarizer array detector, which includes: determining the resolution and an indicator of a pixel size of the micro polarizer array detector based on the spatial resolution, the spectral resolution, and the number of the spectral channels; and returning to step 1 to re-determine the spatial resolution, the spectral resolution, the number of the spectral channels and the number of the polarization channels of the system when the resolution of the micro polarizer array detector does not meet the requirements for the spatial resolution and the number of spectral channels of the system;

step 3: analyzing an aliasing model, which includes: designing an encoding matrix; establishing a multi-dimensional discretization energy transmission model of each component of the system, and a two-dimensional aliasing model of the spatial information, spectral information and polarization information obtained on the target surface of the micro polarizer array detector; analyzing whether the aliasing of the spectral information and the polarization information in the multi-dimensional discretization energy transmission model of each component of the system is independent, and whether the encoded two-dimensional aliasing information of space, spectrum and polarization conforms to restricted isometry property of compressed sensing; and modifying the encoding matrix or returning to step 1 to re-determine the spatial resolution, the number of the spectral channels and the number of the polarization channels of the system when the multi-dimensional discretization energy transmission model is not independent or the aliasing information obtained on the target surface of the micro polarizer array detector does not conform to the RIP criterion;

step 4: determining an unmixing and reconstruction method, which includes: determining and optimizing a measurement matrix, a sparse matrix, the encoding matrix and a reconstruction algorithm based on the two-dimensional aliasing model of the spatial information, spectral information and polarization information obtained on the target surface of the micro polarizer array detector; according to a corresponding relationship between the polarization array, the encoding matrix and the grating, each group of polarization spectral images differing from an adjacent group of polarization spectral images by $2t(t \in N^*)$ pixels on the micro polarizer array detector; by such a result as prior knowledge of a focal length design of the third mirror in a subsequent optical system, guiding an optical design; and restoring the spectral image of each polarization direction restored by using a Two-Step Iterative Shrinkage Thresholding (TwIST) algorithm to finally generate a data cube;

the spectral polarization integrated imaging system based on spatial dimension coding uses a method in which polarization pixels are first separated, and then the a spectrum is reconstructed; during an unmixing process before the reconstruction, the polarization information in a same direction is extracted to form four (0°, 45°, 90°, 135°) polarization images; the measurement matrix uses four sets of independent Bernoulli random matrices, therefore all the four images meet the restricted isometry property, and elements $\Phi_i$ and $\Phi_j$ in an M'×N' Bernoulli random matrix $\Phi$ are independent of each other with a distribution:

$$\Phi_{i,j} = \begin{cases} \frac{1}{\sqrt{M'}} & p = \frac{1}{2} \\ -\frac{1}{\sqrt{M'}} & p = \frac{1}{2} \end{cases},$$

where p denotes a probability; images before the four sets of polarization images (0°, 45°, 90°, 135°) are separated conforms to the property of the Bernoulli random matrix, and the formed encoding matrix meets a requirement of compressed sensing; and the reconstruction algorithm in this system applies compressed sensing-related theories; a formula of compressed sensing is $y=\Phi x=\Phi\Psi s=As$, and most signals in the nature are not sparse, but can be sparsely represented in a certain domain, that is, $x=\Psi s$; herein, $\Psi$ denotes an M×N dimensional sparse basis, and s is a N-dimensional sparse signal; it is known that a linear equation, $y=As$, is an underdetermined equation for $y \in R^m$, $x \in R^n$, and $A \in R^{m \times n}$, that is, 1-norm of a convex function needs to be used to find a sparse solution; therefore, a target equation may be converted into $\min\|x\|1 s.t. y=As$ to implement complete reconstruction of a signal;

when the indicator of optical system design is not derived from the corresponding relationship between the polarization array, encoding matrix and the grating or the spectral image of each polarization direction is not restored based on the TwIST algorithm, returning to step 1 to re-determine the spatial resolution, the spectral resolution, the number of the spectral channels and the number of the polarization channels of the system, or returning to step 3 to redesign the encoding matrix;

step 5: selecting an encoding component, which includes: determining DMD resolution based on a corresponding relationship between the encoding matrix, the polarization array of the micro polarizer array detector and the spatial resolution of the system; and returning to step 3 to modify the encoding matrix when the DMD resolution does not meet an encoding requirement and a zoom ratio of design in the aliasing model;

step 6: designing a beam-splitting element, which includes: selecting the grating as a beam-splitting element, where a grating equation is d sin $(\alpha \pm \beta)=M\lambda$, $\alpha$ is an incident angle, $\beta$ is a diffraction angle, d is a grating constant, M is a diffraction order, and $\lambda$ is a wavelength; a plus sign indicates that a diffracted light and an incident light are on a same side of a grating normal line, and a minus sign indicates that the diffracted light and the incident light are on an opposite side of the grating normal line; selecting a type and an indicator of the grating based on an aliasing model of a space, a spectrum and a polarization obtained on the target surface of the micro polarizer array detector; and returning to step 1 to re-determine the spatial resolution, the number of the spectral channels, and the number of the polarization channels of the system the polarization channels of the system when the beam-splitting element does not meet a beam-splitting requirement of the aliasing model;

step 7: designing an Offner system, which includes: designing a primary mirror and the third mirror, where the third mirror and the grating constant determine a multi-dimensional aliasing information state on the target surface of the detector of the system; if an interval between adjacent spectral images on the detector is $2t(t \in N^*)$ pixels based on the aliasing model and the reconstruction algorithm, a formula $$2t * p_{CCD} = \begin{cases} f_l[\arcsin(M\lambda/d) - \alpha] & \text{same side} \\ f_l[\alpha - \arcsin(M\lambda/d)] & \text{opposite side} \end{cases}$$

is obtained, where $P_{CCD}$ is the pixel size of the detector; a focal length $f_{first}=f_{third}/c$ of the primary mirror is determined by using the focal length $f_{third}$ of the third mirror analyzed based on the formula, and an analysis result of the aliasing model analyzed by the system, where c is the zoom ratio of the primary mirror to the third mirror, $c=P_{DMD}/e \times P_{CCD}$, e is a positive even number, and $P^{DMD}$ is a mirror size of the DMD; and when the design of the Offner system does not meet a requirement of the aliasing model for beam-splitting, imaging indicator or zoom ratio, returning to step 1 to re-determine the spatial resolution, the spectral resolution, the number of spectral channels and the number of the polarization channels of the system, or returning to step 5 to re-determine the DMD resolution, or returning to step 6 to re-select the grating index;

step 8: designing an objective lens, which includes: designing the objective lens based on an application environment and an imaging indicator of the system.

The advantages of the present disclosure compared to the prior art are:

Compared to a traditional method, in this method, the disclosure adopts an interactive design of a spectral polarization optical system with core components such as a coded aperture, a beam-splitting element, a micro polarizer array detector, an unmixing method and a reconstruction algorithm as priori knowledge, and matching of an encoding matrix with a micro polarizer array as a core task of a reverse design, to form an interactive design method combining optics and computation, and thus the designed spectral polarization integrated imaging system can implement real-time imaging of a target based on polarization, spectrum and space, with fewer errors, high detection accuracy and high information matching degree of the system.

DETAILED DESCRIPTION OF THE EMBODIMENTS

The present disclosure is further described in detail with reference to the accompanying drawings.

Figure 1:
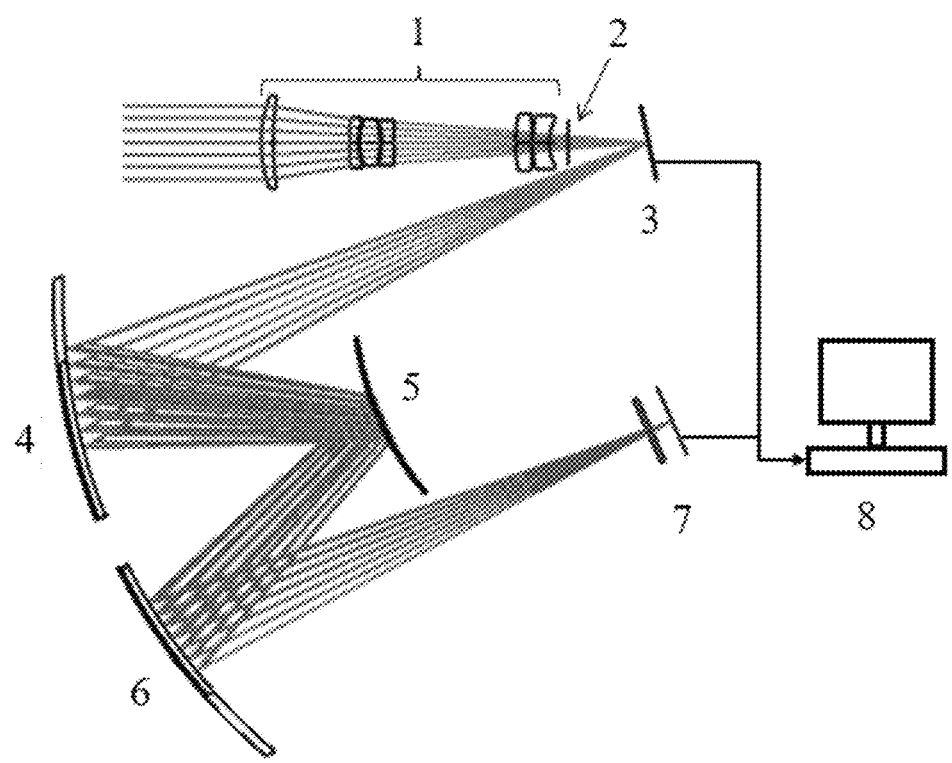
FIG. 1 is a schematic diagram of a spectral polarization integrated imaging system based on spatial dimension coding according to the present disclosure.

As shown in FIG. 1, a spectral polarization integrated imaging system based on spatial dimension coding is provided, including an objective lens 1, a filter 2, a digital mirror device (DMD) 3, a primary mirror 4, a convex grating 5, the third mirror 6, a micro polarizer array detector 7, and a computer 8.

An Offner system is composed of the primary mirror 4, the convex grating 5, and the third mirror 6. The objective lens 1 generates an image of a target on the DMD 3; the filter 2 filters out light in a non-working band before the light enters into the DMD 3; the DMD 3 is disposed on a focal plane of the objective lens 1. The DMD 3 is connected to the computer 8; the computer 8 controls an encoding matrix loaded on the DMD 3 to encode information. The light is reflected to the primary mirror 4 after being encoded by the DMD 3, and then the light is reflected by the primary mirror 4 to the convex grating 5 for dispersion; the light subjected to the dispersion is then reflected to the third mirror 6; an encoded image is produced on the micro polarizer array detector 7; polarization channel coding is completed by using a micro polarizer array on the micro polarizer array detector 7. The micro polarizer array detector 7 is connected to the computer 8; and the computer 8 resolves compressive spectral polarization image based on spectral polarization coding data cube obtained on a target surface of the micro polarizer array detector 7.

The DMD 3 may be replaced by a fixed encoding mask device.

A combination of the primary mirror 4, the convex grating 5, and the third mirror 6 is not limited to a form of the Offner system and may be a lens combination.

Figure 2:
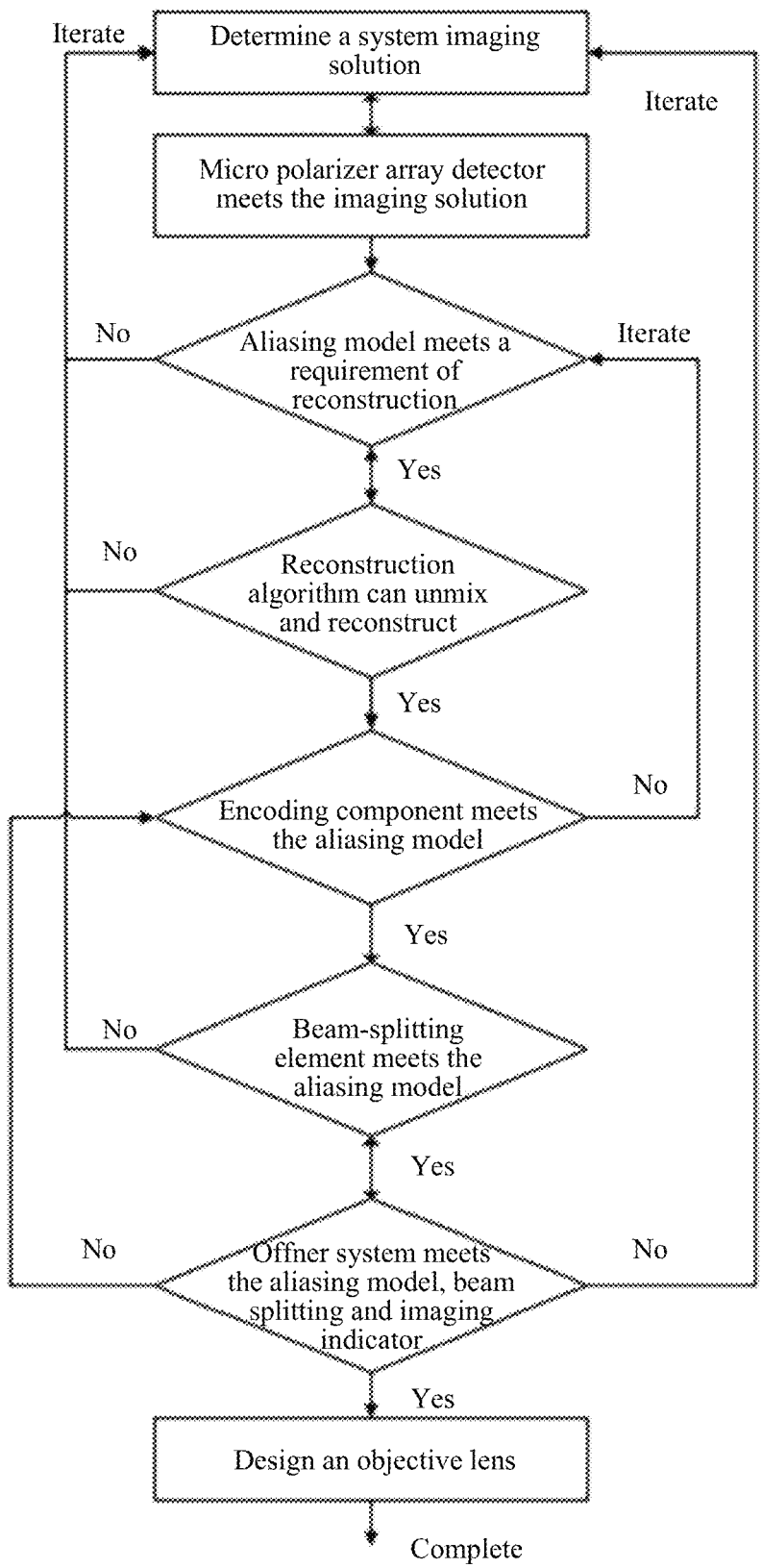
FIG. 2 is a flowchart of a design method of a spectral polarization integrated imaging system based on spatial dimension coding according to the present disclosure.

FIG. 2 shows a design method of a spectral polarization integrated imaging system based on spatial dimension coding. The method includes: determining a system imaging solution; selecting a micro polarizer array detector; analyzing an aliasing model; determining a reconstruction algorithm; selecting an encoding device; designing a beam-splitting element; designing an Offner system; and designing an objective lens. The design method comprises steps S1-S8.

In step 1: an indicator and components of the system are determined. A working scene of the system is analyzed; spatial resolution, spectral resolution, the number of spectral channels and the number of polarization channels of the spectral polarization integrated system based on spatial dimension coding are determined based on an initial imaging structure of the system. A DMD, a grating, and a micro polarizer array detector are preliminarily determined.

In step 2, the micro polarizer array detector 7 is determined. The resolution of the micro polarizer array detector and an indicator of a pixel size of the micro polarizer array detector are determined based on the spatial resolution, the spectral resolution, and the number of the spectral channels. When the resolution of the micro polarizer array detector does not meet requirements for the spatial resolution and the number of the spectral channels of the system, the method returns to step 1 to re-determine the spatial resolution, the spectral resolution, the number of the spectral channels and the number of the polarization channels of the system.

In step 3, an aliasing model is analyzed. An encoding matrix is designed. A multi-dimensional discretization energy transmission model of each component of the system, and a two-dimensional aliasing model of the spatial information, spectral information and polarization information obtained on the target surface of the micro polarizer array detector are established, as shown in A4 in FIG. 3. It is analyzed whether the aliasing of the spectral information and the polarization information in the multi-dimensional discretization energy transmission model of each component of the system is independent, and whether the encoded two-dimensional aliasing information of space, spectrum and polarization conforms to restricted isometry property (RIP) of compressed sensing. If the multi-dimensional discretization energy transmission model is not independent or the aliasing information obtained on the target surface of the micro polarizer array detector does not conform to the RIP criterion, the encoding matrix is modified or the method returns to step 1 to re-determine the spatial resolution, the number of the spectral channels and the number of the polarization channels of the system.

In step 4, an unmixing and reconstruction method is determined. A measurement matrix, a sparse matrix, the encoding matrix and a reconstruction algorithm are determined and optimized based on the two-dimensional aliasing model of the spatial information, spectral information and polarization information obtained on the target surface of the micro polarizer array detector. According to a corresponding relationship between the polarization array, the encoding matrix and the grating, each group of polarization spectral images differs from an adjacent group of polarization spectral images by $2t (t \in N^*)$ pixels on the micro polarizer array detector, and such a result can be prior knowledge of a focal length design of the third mirror in a subsequent optical system to guide an optical design. The spectral image of each polarization direction is restored by using TwIST algorithm to finally generate a data cube.

This system uses a method in which polarization pixels are first separated, and then the spectrum is reconstructed. During an unmixing process before the reconstruction, the polarization information in the same direction is extracted to form four (0°, 45°, 90°, 135°) polarization images, the measurement matrix uses four sets of independent Bernoulli random matrices, and therefore all the four images meet the restricted isometry property. Elements $\Phi_i$ and $\Phi_j$ in an M'×N' Bernoulli random matrix $\Phi$ are independent of each other, and $\Phi_{i,j}$ is shown as follows:

$$\Phi_{i,j} = \begin{cases} \frac{1}{\sqrt{M'}} & p = \frac{1}{2} \\ -\frac{1}{\sqrt{M'}} & p = \frac{1}{2} \end{cases},$$

where p denotes a probability; the images before the four sets of polarization images (0°, 45°, 90°, 135°) are separated conforms to the property of the Bernoulli random matrix, and the formed encoding matrix meets a requirement of compressed sensing.

The reconstruction algorithm in this system applies compressed sensing-related theories. A formula of compressed sensing is y=Φx=ΦΨ s=As, and most signals in the nature are not sparse, but can be sparsely represented in a certain domain, that is, x=Ψs. Herein, Ψ denotes an M×N dimensional sparse basis, and s is a N-dimensional sparse signal. It is known that a linear equation, y=As, is an underdetermined equation for $y \in R^m$, $x \in R^n$, and $A \in R^{m \times n}$, that is, 1-norm of a convex function needs to be used to find a sparse solution. Therefore, a target equation may be converted into min∥x∥1s·ty=As to implement complete reconstruction of a signal.

When the indicator of optical system design cannot be derived from the corresponding relationship between the polarization array, encoding matrix and the grating or the spectral image of each polarization direction cannot be restored based on the TwIST algorithm, the method returns to step 1 to re-determine the spatial resolution, the spectral resolution, the number of the spectral channels and the number of the polarization channels of the system, or returns to step 3 to redesign the encoding matrix.

In step 5, an encoding component is selected. A DMD resolution is determined based on a corresponding relationship between the encoding matrix, the polarization array of the micro polarizer array detector and the spatial resolution of the system. When the DMD resolution cannot meet an encoding requirement and a zoom ratio of design in the aliasing model, the method returns to step 3 to modify the encoding matrix.

In step 6, a beam-splitting element is designed. The grating is selected as a beam-splitting element, and a grating equation is d sin(α±β)=Mλ in this system, α is an incident angle, β is a diffraction angle, d is a grating constant, M is a diffraction order, and Δ is a wavelength, a plus sign indicates that a diffracted light and an incident light are on the same side of a grating normal line, and a minus sign indicates that the diffracted light and the incident light are on an opposite side of the grating normal line. A type and an indicator of the grating is selected based on an aliasing model of a space, a spectrum and a polarization obtained on the target surface of the micro polarizer array detector; and when the beam-splitting element does not meet a beam-splitting requirement of the aliasing model, the method returns to step 1 to re-determine the spatial resolution, the number of the spectral channels, and the number of the polarization channels of the system.

In step 7, an Offner system is designed. The design of the Offner system includes a design of a primary mirror and a design of the third mirror; the third mirror and the grating constant determine the multi-dimensional aliasing information state on the target surface of the detector of the system; when an interval between adjacent spectral images on the detector is $2t (t \in N^*)$ pixels based on the aliasing model and the reconstruction algorithm, a formula $$2t \times p_{CCD} = \begin{cases} f_I[\arcsin(M\lambda/d) - \alpha] & \text{same side} \\ f_I[\alpha - \arcsin(M\lambda/d)] & \text{opposite side} \end{cases}$$

is obtained, where $P_{CCD}$ is the pixel size of the detector; a focal length $f_{first}=f_{third}/c$ of the primary mirror is determined by using the focal length $f_{third}$ of the third mirror analyzed based on the formula, and an analysis result of the aliasing model analyzed by the system, where c is a zoom ratio of the primary mirror to the third mirror, $c=P_{DMD}/e \times P_{CCD}$, e is a positive even number, and $P_{DMD}$ is a mirror size of the DMD; and when the design of the Offner system does not meet a requirement of the aliasing model for beam-splitting, imaging indicator or zoom ratio, the method returns to step 1 to re-determine the spatial resolution, the spectral resolution, the number of spectral channels and the number of the polarization channels of the system, or returns to step 5 to re-determine the DMD resolution, or returns to step 6 to re-select the grating index.

In step 8, an objective lens is designed. The objective lens is designed based on an application environment of the system and an imaging indicator of an overall system.

Figure 3:
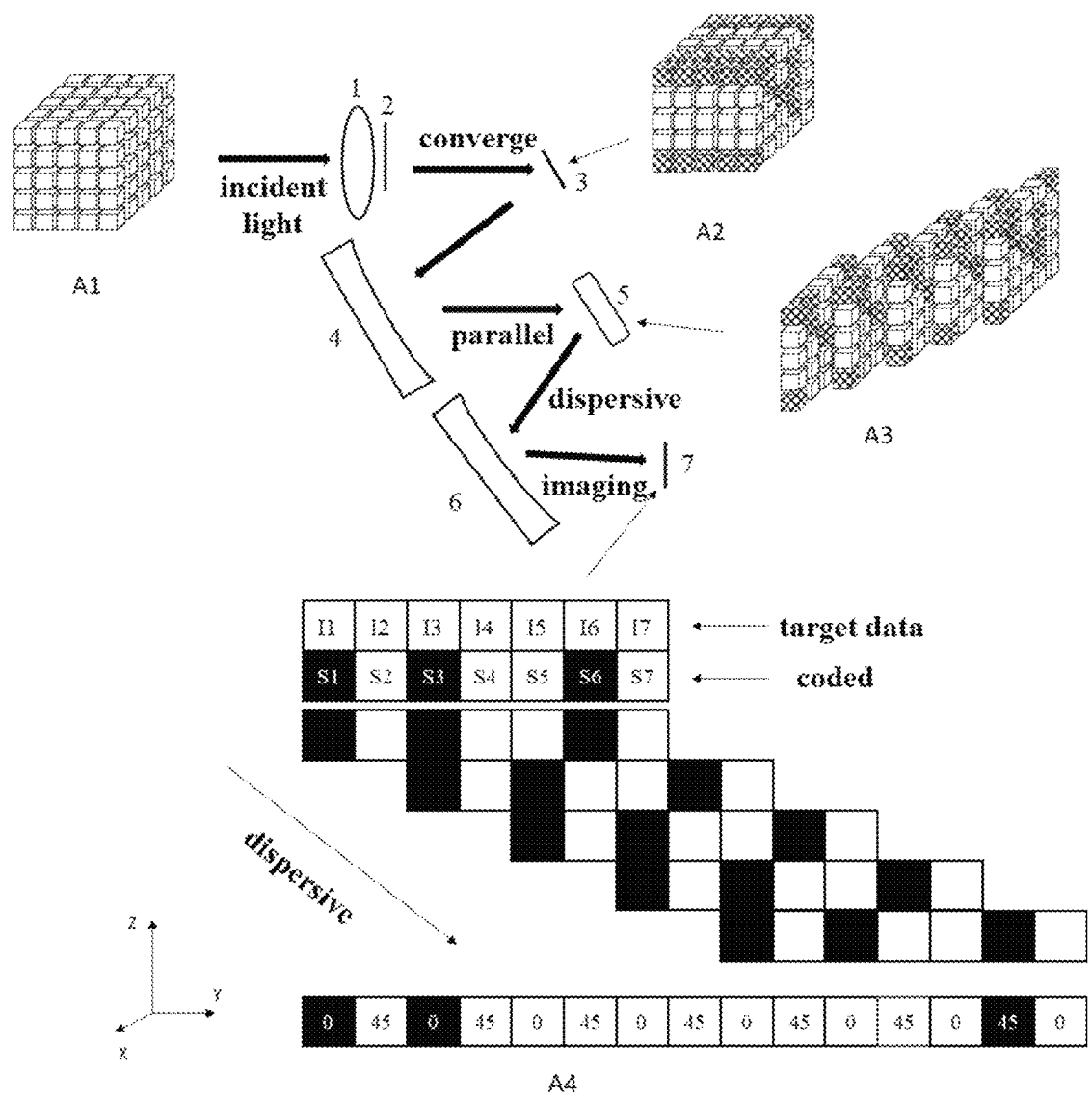
FIG. 3 is a schematic diagram of multi-dimensional discretization energy transmission of a spectral polarization integrated imaging system based on spatial dimension coding according to the present disclosure.

As shown in FIG. 3, a multi-dimensional discretization energy transmission model of the system is established. In the system, an objective lens 1 generates an image of a target data cube A1 on a focal plane of the objective lens 1 after filtering of the filter 2, the spatial light modulator 3 as the primary image plane encodes the image of the target data cube A1 to obtain an encoded and modulated data cube A2, and then the encoded and modulated data cube A2 is reflected onto the convex grating 5 through the primary mirror 4 for dispersion to obtain a dispersed data cube A3. Then, the encoded spectral polarization image is imaged onto the micro polarizer array detector 7 through the third mirror 6. The polarization channel gating encoding with transmittance axes of 0°, 45°, 90°, and 135° is completed through the micro polarizer array on the detector. The two-dimensional data obtained by the micro polarizer array detector is A4.

The method for establishing a model includes steps Sp1-Sp4.

In step Sp1, spectral densities A1 of the target in different polarization directions are established as follows:

$$f_0(x, y; \lambda) = \begin{cases} S_0(x, y; \lambda) \\ S_1(x, y; \lambda), \\ S_2(x, y; \lambda) \end{cases}$$

where $S_0(x, y; \lambda)$, $S_1(x, y; \lambda)$, and $S_2(x, y; \lambda)$ denote distribution of a spatial spectral polarization Stokes parameters, and $\lambda$ denotes a wavelength.

In step Sp2, a data cube A2 that is encoded and modulated by a DMD is established as follows:

$$f_1(x, y; \lambda) = T(x, y) f_0(x, y; \lambda),$$

where T(x,y) denotes an effect of spectral density corresponding to spatial coordinates of the coded aperture. After optical design alignment, spatial coordinates of a space, a DMD, and a target surface of a detector correspond to each other. Therefore, $$T(x, y) = \sum_{n',m'} t_{n',m'} rect\left(\frac{x}{p_1} - x, \frac{y}{p_2} - y\right),$$

$$rect\left(\frac{x}{p} - i, \frac{y}{p} - j\right)$$

denotes the target surface of the DMD, $t_{n',m'}$ is a binary transmission value at a location (n', m') on a coding plane, and p denotes a size of the DMD mirror.

In step Sp3, a spectral density A3 after grating splitting is established as $$f_2(x, y; \lambda) = \iint \delta(x' - x + d_s)\delta(y' - y + d(\lambda - \lambda_c))T(x, y)[S_0(x', y'; \lambda) + S_1(x', y'; \lambda)]dx'dy'$$
$$+ \iint \delta(x' - x + d_s)\delta(y' - y + d(\lambda - \lambda_c))T(x, y)[S_0(x', y'; \lambda) - S_1(x', y'; \lambda)]dx'dy'$$
$$+ \iint \delta(x' - x + d_s)\delta(y' - y + d(\lambda - \lambda_c))T(x, y)[S_0(x', y'; \lambda) + S_2(x', y'; \lambda)]dx'dy'$$
$$+ \iint \delta(x' - x + d_s)\delta(y' - y + d(\lambda - \lambda_c))T(x, y)[S_0(x', y'; \lambda) - S_2(x', y'; \lambda)]dx'dy'$$

where, Dirac $\delta$ function denotes dispersion generated by the grating, with a dispersion equation of $(\lambda - \lambda_c)$ and a central wavelength of $\lambda_c$.

In step Sp4, a two-dimensional aliasing model A4 ($g_{nm}$) for spatial information, spectral information, and four sets of polarization information obtained on the target surface of the micro polarizer array detector is established.

Because a one-dimensional grating is used, a spectral density on a detector plane is dispersed on a Y axis. Continuous images on the detector plane can be described as $$g(x, y) = \int f_2(x, y; \lambda) d\lambda$$

The encoded spectral polarization data cube is projected onto a micro polarizer array detector camera. Each pixel of the detector is used to measure integral strength of a spectral density at a specific polarization angle in a spectral region. g (x, y) measured by the detector is a sum of spectral densities of X groups of polarization images, and X denotes the number of the spectral channels after a beam is split by the grating. In addition, because a detector array is pixelated with pixel spacing $p_2$ in space, sampling in a spatial domain on a detector plane g (n, m) is:

$$g_{nm} = \iint g(x, y) rect\left(\frac{x}{p_{MPA}} - m, \frac{y}{p_{MPA}} - n\right) dxdy.$$

To facilitate data cube reconstruction, an effective feature size of the coding aperture is optically designed to be close to a pixel size $p_{MPA}$ of the detector. Therefore $$g_{nm} = \iint g(x, y) rect\left(\left(\frac{x}{p_{MPA}} - m, \frac{y}{p_{MPA}} - n\right) dxdy = \right.$$
$$\iiint f_2(x, y; \lambda) rect\left(\frac{x}{p_{MPA}} - m, \frac{y}{p_{MPA}} - n\right) dxdyd\lambda =$$
$$\iiint \delta(x' - x + d_s)\delta(y' - y + d(\lambda - \lambda_c))$$
$$T(x, y)[S_0(x', y'; \lambda) + S_1(x', y'; \lambda)] rect\left(\frac{x}{p_{MPA}} - m, \frac{y}{p_{MPA}} - n\right) dxdyd\lambda +$$
$$\iiint \delta(x' - x + d_s)\delta(y' - y + d(\lambda - \lambda_c))T(x, y)[S_0(x', y'; \lambda) - S_1(x', y'; \lambda)]$$
$$rect\left(\frac{x}{p_{MPA}} - m, \frac{y}{p_{MPA}} - n\right) dxdyd\lambda +$$
$$\iiint \delta(x' - x + d_s)\delta(y' - y + d(\lambda - \lambda_c))T(x, y)[S_0(x', y'; \lambda) + S_2(x', y'; \lambda)]$$

-continued $$rect\left(\frac{x}{p_{MPA}} - m, \frac{y}{p_{MPA}} - n\right)dxdyd\lambda +$$

$$\int\int\int \delta(x' - x + d_s)\delta(y' - y + d(\lambda - \lambda_c))T(x, y)[S_0(x', y'; \lambda) - S_2(x', y'; \lambda)]$$

$$rect\left(\left(\frac{x}{p_{MPA}} - m, \frac{y}{p_{MPA}} - n\right)dxdyd\lambda.$$

An expression relationship between $I_0°\sim I_{135}°$ and $S_0(x,y;\lambda)\sim S_2(x,y;\lambda)$ is:

$$I_{0°} = \frac{S_0 + S_1}{2}, I_{45°} = \frac{S_0 + S_2}{2}, I_{90°} = \frac{S_0 - S_1}{2}, I_{135°} = \frac{S_0 - S_2}{2}.$$

It can be seen from the above equation that each group of polarization information is independent of each other and is related to a wavelength, and is an underdetermined equation. Therefore, a row of spectral data slices (A1, A2, A3, A4) from an original data cube can illustrate a transmission mechanism of this discrete model. Information aliasing of the system is divided into two stages. The first stage corresponds to information aliasing generated by the grating. When the grating splits a beam, spatial distribution of spectral information and polarization information in each channel is consistent, resulting in aliasing with spatial information. The second stage corresponds to information aliasing generated by the micro polarizer array. After the beam is split, a fixed distance spatial misalignment spectral channel is imaged on the micro polarizer array detector. Because the distribution of polarization information is in one-to-one correspondence to spatial distribution in the micro polarizer array, the spectral information is also gated during channel selection coding of polarization information, thereby resulting in multi-dimensional aliasing information of spectrum and polarization.

The above are merely preferred examples of the present disclosure, and are not intended to limit the present disclosure. Any modifications, equivalent replacements, improvements, and the like made within the spirit and principle of the present disclosure shall be all included in the scope of the present disclosure. The content not described in detail in the description is existing technologies known by those skilled in the art.

What is claimed is:

1. A design method of a spectral polarization integrated imaging system based on spatial dimension coding, comprising:
   step 1: determining indicators and components of the spectral polarization integrated imaging system based on spatial dimension coding, which comprises: analyzing a working scene of the spectral polarization integrated imaging system based on spatial dimension coding; determining spatial resolution, spectral resolution, a number of spectral channels and a number of polarization channels of the spectral polarization integrated imaging system based on spatial dimension coding, based on an initial imaging structure of the spectral polarization integrated imaging system; and preliminarily determining a digital mirror device (DMD), a grating, and a micro polarizer array detector as the components of the spectral polarization integrated imaging system based on spatial dimension coding;
   step 2: determining the micro polarizer array detector, which comprises: determining resolution and an indicator of a pixel size of the micro polarizer array detector based on the spatial resolution, the spectral resolution, and the number of the spectral channels; and returning to step 1 to re-determine the spatial resolution, the spectral resolution, the number of the spectral channels and the number of the polarization channels of the spectral polarization integrated imaging system based on spatial dimension coding when the resolution of the micro polarizer array detector does not meet requirements for the spatial resolution and the number of the spectral channels of the spectral polarization integrated imaging system based on spatial dimension coding;
   step 3: analyzing an aliasing model, which comprises: designing an encoding matrix; establishing a multi-dimensional discretization energy transmission model of each component of the spectral polarization integrated imaging system based on spatial dimension coding, and a two-dimensional aliasing model of spatial information, spectral information and polarization information obtained on a target surface of the micro polarizer array detector; analyzing whether aliasing of the spectral information and the polarization information in the multi-dimensional discretization energy transmission model of each component of the spectral polarization integrated imaging system based on spatial dimension coding is independent, and whether encoded two-dimensional aliasing information of space, spectrum and polarization conforms to restricted isometry property of compressed sensing; and modifying the encoding matrix or returning to step 1 to re-determine the spatial resolution, the number of the spectral channels and the number of the polarization channels of the spectral polarization integrated imaging system based on spatial dimension coding when the multi-dimensional discretization energy transmission model is not independent or the aliasing information obtained on the target surface of the micro polarizer array detector does not conform to a restricted isometry property (RIP) criterion;
   step 4:
   during an unmixing process, extracting the polarization information in a same direction from the encoded two-dimensional aliasing information of space, spectrum and polarization information to form four (0°, 45°, 90°, 135°) polarization images;
   during a reconstruction process, setting an independent Bernoulli random matrix as a measurement matrix and the encoding matrix, setting a sparse matrix, selecting a Two-Step Iterative Shrinkage Thresholding (TwIST) algorithm as a reconstruction algorithm; and based on the four (0°, 45°, 90°, 135°) polarization images, the measurement matrix, the encoding matrix, and the sparse matrix, restoring a spectral image of each polarization direction by using the Two-Step Iterative Shrinkage Thresholding (TwIST) algorithm to finally generate a data cube;
   wherein according to a corresponding relationship between a polarization array, the encoding matrix and the grating, each group of polarization spectral images differs from an adjacent group of polarization spectral images by $2t(t\in N^*)$ pixels on the micro polarizer array detector; and optical design is guided by such a result as priori knowledge of a focal length design of a third mirror in a subsequent optical system; and
   when an indicator of optical system design is not derived from the corresponding relationship between the polarization array, the encoding matrix and the grating or the spectral image of each polarization direction is not restored based on the TwIST algorithm, returning to step 1 to re-determine the spatial resolution, the spectral resolution, the number of the spectral channels and the number of the polarization channels of the spectral polarization integrated imaging system based on spatial dimension coding, or returning to step 3 to redesign the encoding matrix;

step 5: selecting an encoding component, which comprises: determining DMD resolution based on a corresponding relationship between the encoding matrix, the polarization array of the micro polarizer array detector and the spatial resolution of the spectral polarization integrated imaging system based on spatial dimension coding; and returning to step 3 to modify the encoding matrix when the DMD resolution does not meet an encoding requirement and a zoom ratio of design in the aliasing model;

step 6: designing a beam-splitting element, which comprises: selecting the grating as a beam-splitting element, wherein a grating equation is $d\sin(\alpha\pm\beta)=M\lambda$, $\alpha$ is an incident angle, $\beta$ is a diffraction angle, d is a grating constant, M is a diffraction order, and $\lambda$ is a wavelength, a plus sign indicates that a diffracted light and an incident light are on a same side of a grating normal line, and a minus sign indicates that the diffracted light and the incident light are on an opposite side of a grating normal line; selecting a type and an indicator of the grating based on an aliasing model of a space, a spectrum and a polarization obtained on the target surface of the micro polarizer array detector; and returning to step 1 to re-determine the spatial resolution, the number of the spectral channels, and the number of the polarization channels of the spectral polarization integrated imaging system based on spatial dimension coding when the beam-splitting element does not meet a beam-splitting requirement of the aliasing model;

step 7: designing an Offner system, which comprises: designing a primary mirror and the third mirror, wherein the third mirror and grating constant determine a multi-dimensional aliasing information state on the target surface of the detector of the spectral polarization integrated imaging system based on spatial dimension coding; when an interval between adjacent spectral images on the detector is $2t(t\in N^*)$ pixels based on the aliasing model and the reconstruction algorithm, a formula $$2t \times p_{CCD} = \begin{cases} f_1[\arcsin(M\lambda/d) - \alpha] & \text{same side} \\ f_1[\alpha - \arcsin(M\lambda/d)] & \text{opposite side} \end{cases}$$

is obtained, wherein $P_{CCD}$ is the pixel size of the micro polarizer array detector; a focal length $f_{third}$ of the third mirror is analyzed based on the formula, a focal length $f_{first}=f_{third}/c$ of the primary mirror is determined based on an analysis result of the aliasing model analyzed by the spectral polarization integrated imaging system, wherein c is a zoom ratio of the primary mirror to the third mirror, $c=P_{DMD}/e\times P_{CCD}$, e is a positive even number, and $P_{DMD}$ is a mirror size of the DMD; and when design of the Offner system does not meet a requirement of the aliasing model for beam-splitting, imaging indicator or zoom ratio, returning to step 1 to re-determine the spatial resolution, the spectral resolution, the number of spectral channels and the number of the polarization channels of the spectral polarization integrated imaging system based on spatial dimension coding, or returning to step 5 to re-determine the DMD resolution, or returning to step 6 to re-select a grating index;

step 8: designing an objective lens, which comprises: designing the objective lens based on an application environment and an imaging indicator of the spectral polarization integrated imaging system based on spatial dimension coding;

step 9: manufacturing the spectral polarization integrated imaging system based on spatial dimension coding comprising: an objective lens, a filter, a target DMD, a target primary mirror, a target convex grating, a target third mirror, a target micro polarizer array detector, and a computer; wherein, the target micro polarizer array detector is selected based on the determined resolution and indicator of the pixel size of the micro polarizer array detector, the target DMD is selected based on the determined DMD resolution, the target convex grating is selected based on the selected type and indicator of the grating, the target third mirror is selected based on the analyzed focal length of the third mirror, and the target primary mirror is selected based on the determined focal length of the primary mirror;

wherein the Offner system comprises the target primary mirror, the target convex grating, and the target third mirror; and the objective lens generates an image of a target on the target DMD; the filter filters out light in a non-working band before the light enters into the target DMD; the target DMD is disposed on a focal plane of the objective lens; the target DMD is connected to the computer; the computer controls an encoding matrix loaded on the target DMD to encode information; the light is reflected to the target primary mirror after being encoded by the target DMD, and then the light is reflected by the target primary mirror to the target convex grating for dispersion; the light subjected to the dispersion is then reflected to the target third mirror; an encoded image is produced on the target micro polarizer array detector; polarization channel coding is completed by using a micro polarizer array on the target micro polarizer array detector; the target micro polarizer array detector is connected to the computer; and the computer performs calculation on spectral polarization coding data cube obtained on a target surface of the target micro polarizer array detector to obtain a compressive spectral polarization image.

\* \* \* \* \*